United States Patent [19]
Barnhart

[11] 3,812,656
[45] May 28, 1974

[54] AIR CLEANING DEVICE
[76] Inventor: John T. Barnhart, R.R. 1, Box 179, Rolling Prairie, Ind. 46379
[22] Filed: Aug. 21, 1972
[21] Appl. No.: 282,288

[52] U.S. Cl. ............. 55/220, 261/116, 261/DIG. 54
[51] Int. Cl... B01d 47/06, B01d 47/10, B01d 47/16
[58] Field of Search ............. 55/238, 240, 241, 383, 55/DIG. 30, 235, 237, 257, 339, 340, 429, 466, DIG. 14, 437, 467, 473; 261/DIG. 54, 196

[56] References Cited
UNITED STATES PATENTS

| | | | |
|---|---|---|---|
| 1,054,589 | 2/1913 | Mebtern | 55/257 |
| 2,795,103 | 6/1957 | Jenison | 55/DIG. 30 |
| 2,852,239 | 9/1958 | Vicard | 261/76 |
| 3,102,800 | 9/1963 | Bora | 55/467 |
| 3,385,030 | 5/1968 | Letvin | 55/257 |
| 3,708,961 | 1/1973 | Kimmel | 55/DIG. 30 |

FOREIGN PATENTS OR APPLICATIONS

| | | | |
|---|---|---|---|
| 895,669 | 5/1962 | Great Britain | 55/237 |

*Primary Examiner*—Bernard Nozick
*Assistant Examiner*—David Lacey
*Attorney, Agent, or Firm*—Kenneth T. Snow

[57] ABSTRACT

The air cleaning device described herein uses the well known cleaning ability of a "venturi" scrubber arranged in a configuration which will allow efficient cleaning of dirt laden air at significantly lower horsepowers than other devices currently in use. The apparatus incorporates a venturi nozzle section for accelerating the air into the necessary high velocity component to break up the water droplets for adequate collection of sub-micron particles. By incorporating an efficient regain section on the downstream side of the nozzle and running this regain section directly into the inlet of an unhoused centrifugal backwardly inclined fan, we are able to fully utilize the velocity already generated and the energy contained within that high velocity air to create an integral venturi fan combination which will operate at significantly lower horsepowers than other devices using separate components. Other aspects of the device include a "Y" separator which removes a large percentage of the water from the water air mixture in the nozzle to further reduce the horsepower consumed in the fan wheel. The clean air passing through the fan wheel is then discharged into an enclosure which acts as a supporting structure for the entire device. This enclosure offers additional separation of the water mist from the air through possible centrifugal action of the fan wheel within the enclosure. The device then is able to collect air-borne matter using water or other liquids as the collecting media and is able to separate these such that the clean air is discharged for re-use, while the dirt laden water is processed through conventional means for final removal of the original airborne matter.

8 Claims, 1 Drawing Figure

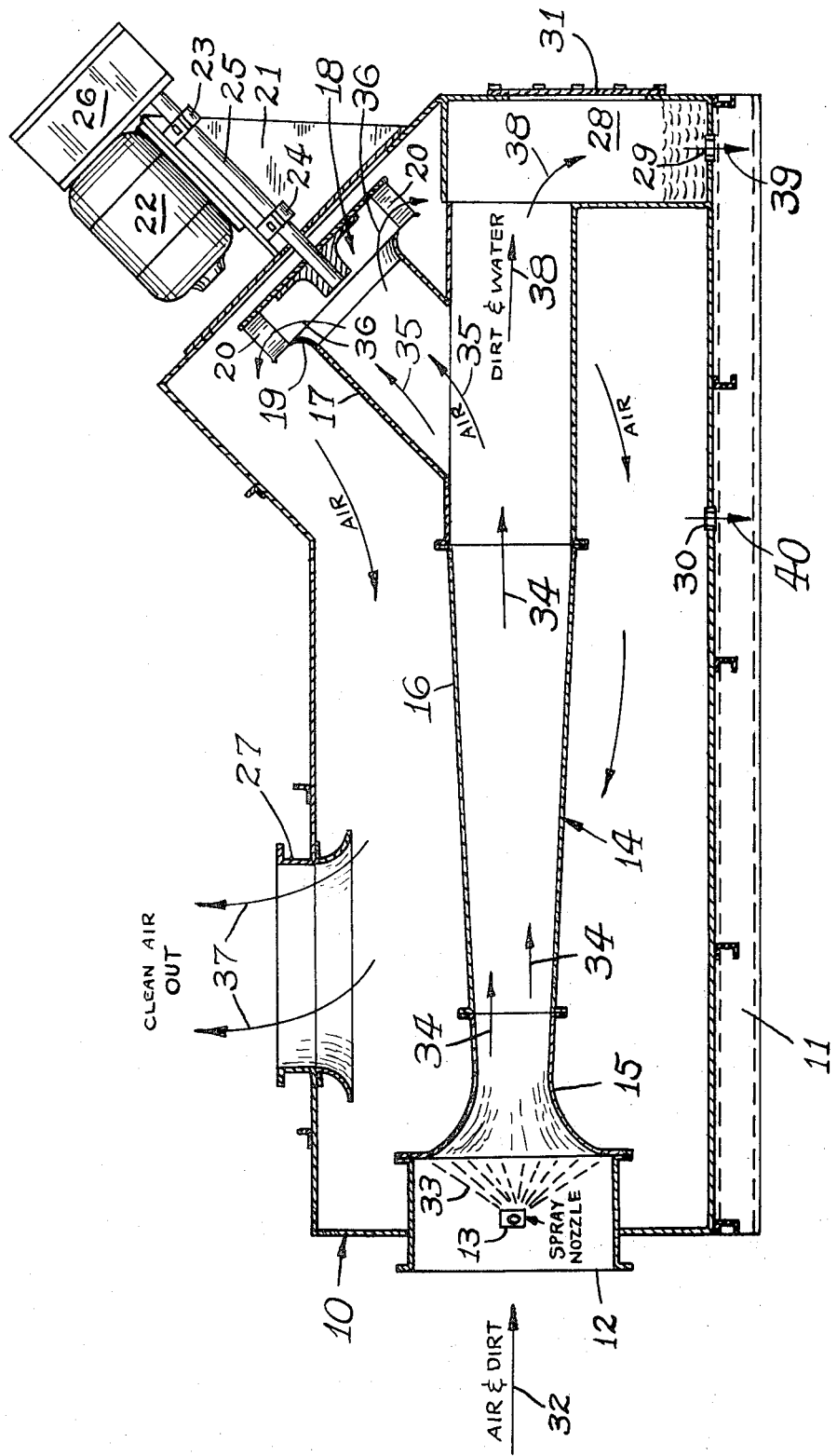

AIR CLEANING DEVICE

BACKGROUND OF THE INVENTION

1. Field of the Invention

Ecology has come to the forefront for the inhabitants of our world. Our millions of automobiles and industrial plants are a few of the man-made sources that have been severely contiminating the atmosphere. Many plant processes are contributing to this by adding airborne wastes directly into the air. It is essential, therefore, that cleaning devices of this type be used in an attempt to reduce much of this discharged effluent. Unfortunately devices currently in use have been designed with the only goal being that of adequate collection efficiency with little regard for total horsepower consumption. Unfortunately this does not solve the total ecology problem because additional problems are created at the point where the energy for these units is being generated. This device not only has adequate collection efficiency for these effluents but can offer these results with a relatively large reduction in horsepower consumed over existing units. This not only solves the effluent problem at the factory, but has the overall advantage of using less energy in accomplishing this result.

2. Description of the Prior Art

A patent search has produced the following patents:

| | |
|---|---|
| Jones et al. | 818,891 |
| Fisher | 1,571,253 |
| Vicard | 2,852,239 |
| Letvin | 3,385,030 |
| Vecchio | 3,485,015 |
| Dell'Agnese et al. | 3,517,485 |

The general principle of cleaning air and gases by mixing water therein is old as shown by the 1906 patent to Jones et al U.S. Pat. No. 818,891. Jones mixes the gas to be cleaned with water vapor and then precipitates out the dirt laden water vapor. This idea while being generally in the same category does not incorporate the well known theory of the action of a venturi section for collection of extremely small particles.

Fisher U.S. Pat. No. 2,852,239 again mixes water and air for a primary cleaning but does not use the venturi principle of high velocity scrubbing.

Vicard U.S. Pat. No. 2,852,239 shows and describes the gas cleaner and including a venturi disposed in a horizontal path. The main advantage of this patent is an attempt at higher efficiency cleaning through recycling of a portion of the primary air while no mention is made of lower operation efficiency or the potential horsepower and energy savings used by incorporating a high velocity nozzle section and centrifugal fan wheel.

Letvin U.S. Pat. No. 3,385,030 employs a vertically disposed venturi with a downstream horizontally disposed passage. The principle of this invention is to create extremely fine water droplets through the operation of specialized nozzles and using the nozzles as the atomizing device. This is different from the true venturi principle where atomization of the liquid takes place exclusively from the shearing action of the high velocity airstream.

Vecchio U.S. Pat. No. 3,485,015 is a different type of water scrubbing device which operates on the principle of forcing air through a water bath as its only method of mixing the dirt laden air with the water particles.

Dell'Agnese et al U.S. Pat. No. 3,517,485 shows and describes a vertically disposed venturi and passageway without a fan. The device shows various means of water introduction into basically a venturi section but no mention is made of the fan section or any energy gained by incorporating such a fan into the device.

SUMMARY OF THE INVENTION

The principle object of this invention is to provide a device which has cleaning efficiencies equal to or superior to devices currently on the market, yet operates at substantially lower power consumption.

An important object of this invention is to provide an apparatus for subjecting a dirt contaminated airstream to a cleaning process which forces adhesion of the water to the dirt particles and provides a means of separating these now dirt laden water particles into separate chambers such that the remaining air is essentially clean.

Another object of the invention is the method by which this velocity is generated and utilized to the point where we are able to provide a combination of components that will operate at substantially lower horsepower.

Still another important object of this invention is the way that this combination of elements is arranged such that this high velocity, high energy air stream allows for basic separation of water and air through a Y shaped division in the central chamber such that horsepower is further reduced by removing large quantities of the cleaning liquid before it is introduced into a fan wheel. Such introduction of water into a fan wheel raises the energy input of the device.

Still another object is the use of an unhoused backwardly inclined centrifugal fan wheel which reduces the cost of manufacture of the device and allows for a centrifugal action to take place in the outside housing around this fan wheel which further helps in separation of the carryover of water mist with the clean air.

Other and further important objects and advantages will become apparent from the disclosures in the accompanying drawings and the following specification.

IN THE DRAWINGS

FIG. 1 is a longitudinal sectional view of the air cleaning apparatus of this invention.

AS SHOWN IN THE DRAWINGS

The reference numeral 10 indicates generally a housing for the air cleaning components of this invention. The housing constitutes an outer shell and may be of any desired exterior shape as it merely acts as a collector for the clean air. The housing 10 is equipped with a floor engaging base 11 to support the entire device in a generally horizontal position.

The air cleaner is provided with an inlet 12 disposed at one end of the elongaged housing 10. Air containing dirt or other foreign matter to be removed therefrom is delivered at duct conveying velocities to the inlet 12. Water nozzles 13 are provided which are connected to an external water supply (not shown) for delivering water to the interior of the inlet. The nozzles 13 preferably have wide openings in order to generally fill the entire circumference of the throat area of the inlet 12 with an even distribution of water. The wide openings also allow recirculated partially contaminated water to be used since they are less likely to be clogged by small particles of foreign matter. The air cleaner includes a cleaning chamber which is a generally air tight horizontally disposed passageway 14, preferably, but not necessarily circular in cross section, which extends from the inlet 12 to the far end of the shell housing 10. The passageway 14 is provided with a restriction 15 consisting of a venturi immediately following the inlet 12. Closely adjacent to the other side of the venturi is a larger diameter regain or expansion portion 16 of the passageway 14.

An upwardly inclined passageway 17 joins the horizontal passageway 14 at a location following the regain portion 16 and before it reaches the end of the outer housing 10. The adjoining passageways 14 and 17 form a Y. The tube 14 continues in a horizontal path while the tube 17 turns upward at an incline substantially in the range of 45°. The positioning of the incline passageway 17 is important to the successful operation of the air cleaner of this invention. This turned passageway moves upwardly from the horizontal axis of the tube 14 at an incline angle. Clean air is lighter than water and hence the arrangement of passageways provides the impetus for primary separation of water and air. The lighter clean air moves up the inclined passageway while water being considerably heavier in density is unable to circumvent the turn at high velocity and is forced to proceed horizontally. A backwardly inclined centrifugal fan 18 is unhoused and substantially abuts the upper end of the inclined passageway 17. The fan lies at right angles to the inclined tube 17 and thus uniformly covers the upper end of that tube. The fan 18 creates the negative pressure whose energy is used to accelerate the air and break up the water in the venturi section. This fan also creates flow through the regain portion of the unit and out through the adjacent enclosure. A 45° turn at the tube 17 is highly efficient from an air velocity standpoint and yet is sharp enough to separate a large percentage of the water from the air due to the great difference in density between air and water.

The upper end of the tube 17 is outwardly flared as shown at 19 for better matching with the center of the fan 18. The fan includes a concentric portion 20 which is located outwardly of the centrally positioned tube 17 and within the housing 10. The fan accepts the high velocity air through its center or inlet while maintaining its full capabilities of pressure generation. The unhoused fan wheel then discharges the air into an outer chamber within the housing 10 around the side edges of the flare in 19 and through the concentric portion 20 of the fan 18.

A mounting bracket 21 is provided on the outside of the housing 10 for the purpose of supporting the fan and its driving elements. The fan motor 22 is mounted on the bracket 21. Spaced apart, axially aligned bearings 23 and 24 are carried on the mounting bracket 21 adapted to receive a fan drive shaft 25. The shaft 25 projects inwardly of the housing 10 where it engages and rotatably drives the fan 18. A transmission 26 of any desired form is employed to transmit rotational drive from the motor 22 to the shaft 25.

The housing chamber 10 is a collecting station for the cleaned and dried air that passes through the fan 18. The chamber surrounding the fan 18 is also used as a secondary mist collector due to the centrifugal action of the fan 18. This centrifugal action causes a spinning of the air within that chamber forcing water droplets to be driven outwardly due to centrifugal force where they will adhere and collect on the chamber walls. An oulet port 27 is provided in the top of the housing 10 for the removal of the cleaned air which has passed through the chamber 10.

A Vertical well 28 adjoins the horizontal passageway 14 at the far end of the housing beyond the junction of the upwardly inclined tube 17. This vertical passageway 28 is used to collect the dirt laden water particles. The bottom of the vertical passageway 28 is equipped with a small drain opening 29. Water and dirt thus pass out through this drain opening 29.

The housing 10 is also provided with a small drain opening 30 for getting rid of any accumulated or collected mist or water that comes into the housing chamber with the air passing from the inclined tube 17 through the fan 18 and into the housing chamber. The drain 30 is located in the bottom of the housing which is just opposite the location of the air discharge opening which is located on top of the housing.

A door 31 is provided in the housing 10 adjacent to the vertical passageway 28 for the purpose of providing access to that passageway. Servicing or cleaning of the passageway may thus be made through the door 31.

OPERATION OF THE DEVICE

Air to be cleaned whether it contains dirt, smoke, or other foreign matter is delivered through the inlet 12 of the device at typical duct conveying velocities of approximately 4,000 fpm (feet per minute), in the direction of the arrow 32. When this stream of dirty air is delivered to the cylindrical inlet 12 it is mixed there with a spray of water. The water enters through a nozzle or nozzles 13 and substantially fills the throat of the inlet as shown at 33 so that all of the air will be thoroughly saturated with water. Almost immediately after the air has water admixed therewith the combination stream moves in the direction of arrows 34 and enters the venturi 15. Here the stream is accelerated in velocity to approximately 20,000 to 30,000 fpm. This violent acceleration of air causes the water to be sheared in small droplets which are sufficiently small enough and of such large quantity that they will attach themselves to the dirt contained in the airstream through the well known collection principles of inertial impaction and adhesion. The air and water mixture then proceeds horizontally through the regain passageway 16 where its velocity is reduced such that it will be compatible with the inlet requirements of the unhoused centrifugal fan 18. At this point the air and water mixture are separated in a primary separator consisting of a Y section which uses the greater density of water for separation. The clean air is pulled up the inclined tube 17 in a direction of arrow 35 while the water particles continue horizontally and are eventually collected in chamber 28. The clean air then enters and passes through the fan 18 which is used to create the energy for movement of the air through the device and for the energy required for acceleration of the air and water. After passing through the fan wheel additional separation is accomplished through the centrifugal action of the fan wheel relative to the surrounding chamber 10. Water droplets which have entered the fan are accelerated radially and tangentially where centrifugal force moves the particles outwardly for adhesion to surrounding surfaces. The clean air then continues on through chamber 10 where it is eventually discharged through vertical opening 27 in the direction of arrows 37.

The water/dirt mixture that was separated in the venturi and regain sections of the horizontally disposed tube 14 continues in a horizontal path at the end of tube 14 and follows the arrow 38 which turns downwardly into the vertical tube 28. Because of the fan operation, the chamber including the balance of the horizontal passageway and the depending vertical passageway are under a high negative pressure and hence it is necessary to permit a flow of water to leave the chamber without introducing air at this point. The vertical drop in the tube 28 creates a water head which is in excess of the negative air pressure and thus permits removal of the water through the bottom drain 29, as shown by the arrow 39 without permitting the introduction of additional air. The arrow 40 shows the water path through the drain 30 to the housing chamber 10. The present air cleaner employs a combination of a water separator with an unhoused centrifugal backwardly inclined fan in a simple arrangement of ducts. This arrangement permits the conservation of the high velocity energy necessary in the venturi and utilizes this energy by introducing it directly into the inlet of a centrifugal fan wheel. This combination of energy conversion along with the well known efficiency characteristics of a backwardly inclined centrifugal fan are what allows the device to operate at substantially lower horsepower than conventional units.

I am aware that numerous details of construction may be changed throughout a wide range without departing from the principle disclosed herein and I do not propose limiting the patent granted hereon otherwise than as necessitated by the appended claims.

What is claimed is:

1. An air cleaning apparatus arranged to receive dirt laden air moving horizontally at high speeds, comprising a horizontally disposed generally air tight cleaning chamber, said cleaning chamber having an inlet at one end thereof, means directing water into the dirt laden air stream at the inlet of the cleaning chamber, a horizontally disposed venturi in the cleaning chamber located just inside the inlet to cause an acceleration of the air stream and to cause the water to be sheared into a large quantity of small droplets that attach themselves to the dirt in the air stream, a larger diameter regain passage joining the venturi in the cleaning chamber, a Y joining the regain passage of the cleaning chamber, said Y having an upwardly inclined passage to receive the lighter cleaned air and a continuing horizontal passage to receive the heavier water dirt mixture, a downwardly extending water and dirt discharge passage arranged in communicating relationship with the outer end of the continuing horizontal passage of the cleaning chamber, said continuing horizontal passage of the cleaning chamber carrying the water and dirt mixture remaining after removal of the lighter cleaned air to the downwardly extending discharge passage, said downwardly extending discharge passage having a drain in the bottom thereof for removing the dirt and water mixture from the apparatus, an unhoused rotary centrifugal fan having its central portion abutting and receiving the lighter cleaned air from the upper end of the inclined passage and the fan including a concentric portion located outwardly of the centrally positioned inclined passage, whereby the fan creates a negative pressure, the energy of which is used to accelerate the air and break up the water in the venturi and causes flow of the air stream through the regain passage and pulls the lighter clean air up the inclined passage where it is thrown centrifugally outwardly by its concentric portion beyond the inclined passage for reuse.

2. An air cleaning apparatus as set forth in claim 1 in which the upwardly inclined passage is disposed at approximately 45° to the horizontally disposed cleaning chamber.

3. An air cleaning apparatus arranged to receive dirt laden air moving horizontally at high speeds, comprising a horizontally disposed generally air tight cleaning chamber, said cleaning chamber having an inlet at one end thereof, means directing water into the dirt laden air stream at th inlet of the cleaning chamber, a horizontally disposed venturi in the cleaning chamber located just inside the inlet to cause an acceleration of the air stream and to cause the water to be sheared into a large quantity of small droplets that attach themselves to the dirt in the air stream, a regain passage joining the venturi in the cleaning chamber, a Y joining the regain passage of the cleaning chamber, said Y having an upwardly inclined passage for the lighter clean air and a continuing horizontal passage for the water and dirt mixture, a downwardly extending water and dirt discharge passage arranged in communicating relationship with the outer end of the continuing horizontal passage of the cleaning chamber, said continuing horizontal passage of the cleaning chamber carrying the water and dirt mixture remaining after removal of the lighter clean air to the downwardly extending discharge passage, said downwardly extending discharge passage having a drain in the bottom thereof for removing the dirt and water mixture from the apparatus, an unhoused rotary centrifugal fan having its central portion abutting and receiving the lighter clean air from the upper end of the inclined passage and the fan including a concentric portion located outwardly of the centrally positioned inclined passage, a housing enclosure spaced outwardly from said generally air tight cleaning chamber and including said unhoused rotary fan whereby the unhoused fan draws the lighter clean air up the upwardly inclined Y passage where it is received in the center thereof and the clean air is then redirected centrifugally outwardly by the concentric portion of the fan and thence back and around over the cleaning chamber and within the housing enclosure, said housing enclosure having a discharge port where the clean air may be discharged and used as desired.

4. An air cleaner comprising a generally horizontally disposed air tight cleaning chamber, an inlet at one end of said cleaning chamber admitting dirt laden air to said cleaning chamber, nozzle means directing water into said cleaning chamber at a position adjacent said inlet, a restriction in said cleaning chamber at a position close to the water nozzle means and constituting a horizontally disposed venturi, said cleaning chamber having a larger regain portion on the other side of the venturi, an upwardly inclined clean air passageway joining said cleaning chamber at a position on the other side of the regain portion, an unhoused centrifugal fan having a central portion generally centered over the upper open end of the inclined clean air passageway, said unhoused fan having an outer concentric portion extending radially beyond the inclined clean air passageway, said unhoused fan creating energy for movement of the air through the air cleaner, for accelerating the air and water in the venturi, for pulling the generally clean air up the inclined passageway, and for the centrifugal force for moving the generally clean air outwardly, and means removing the dirt and water from the cleaning chamber at a position beyond the juncture with the inclined passageway.

5. An air cleaner as set forth in claim 4 in which said means removing the dirt and water comprises a vertically depending passageway joined with and having communication with the cleaning chamber.

6. An air cleaner comprising a generally horizontally disposed air tight cleaning chamber, an inlet at one end of said cleaning chamber for admitting dirt laden air at a velocity of approximately 4,000 fpm to said cleaning chamber, nozzle means directing water into said cleaning chamber at a position adjacent said inlet, a restriction in said cleaning chamber at a position close to the nozzle means and the inlet and constituting a horizontally disposed venturi, said cleaning chamber having a larger regain portion on the other side of the venturi, an upwardly inclined clean air passageway joining said cleaning chamber at a position on the other side of the regain portion, an unhoused centrifugal fan located at the upper open end of the inclined passageway, said unhoused fan having a central portion centered over the upper open end of said inclined passageway, said unhoused fan having an outer concentric portion extending beyond the inclined clean air passageway, said unhoused fan in combination with the admission speed of the dirt laden air creating the energy for moving the stream of dirt laden air and water through the device and causing said venturi to increase the speed of the stream to a range of 20,000 to 30,000 fpm to cause the water to be sheared into a large quantity of small droplets, said larger regain portion of the cleaning chamber acting to slow the speed of the stream and to permit dirt particles to be attached to the small water droplets, said fan further acting to pull the cleaned air up the inclined passageway and out the upper end thereof through the central portion and centrifugally outwardly through the outer concentric portion for reuse, and means removing the water and dirt from the cleaning chamber at a position beyond the juncture with the inclined passageway.

7. An air cleaner as set forth in claim 6 in which said means removing the water and dirt comprises a vertically depending passageway at the end of the horizontally disposed cleaning chamber opposite the inlet.

8. An air cleaner as set forth in claim 6 in which the angle of inclination of the upwardly inclined clean air passageway is in the range of 45° to the horizontally disposed cleaning chamber.

* * * * *